United States Patent [19]

McKibbin et al.

[11] 4,283,044

[45] Aug. 11, 1981

[54] APPARATUS FOR GUIDING A TOOL ALONG A CURVED PATH

[76] Inventors: John R. McKibbin, P.O. Box 35209; Frederick B. Tyler, Jr., P.O. Box 58002, both of Birmingham, Ala. 35209

[21] Appl. No.: 23,292

[22] Filed: Mar. 23, 1979

[51] Int. Cl.³ .............................................. B23K 7/10
[52] U.S. Cl. ..................... 266/67; 266/58; 29/469.5; 83/565
[58] Field of Search ...................... 266/58, 60, 56, 62, 266/67, 70, 73; 29/469.5; 83/565

[56] References Cited

U.S. PATENT DOCUMENTS

| 821,681 | 5/1906 | Vandermark | 83/565 |
| 978,486 | 12/1910 | Reed | 83/565 |
| 1,154,924 | 9/1915 | Holub | 83/565 |
| 1,162,587 | 11/1915 | Eimann | 266/67 |
| 1,646,129 | 10/1927 | Wagner | 266/58 |
| 2,291,395 | 7/1942 | Levey | 266/56 |
| 2,705,629 | 4/1955 | Miller | 266/67 |
| 3,540,263 | 11/1970 | Suzuki et al. | 73/37.5 |
| 3,614,078 | 10/1971 | Hepler | 266/56 |
| 3,619,301 | 11/1971 | Suzuki | 148/9 |
| 3,941,358 | 3/1976 | Darling | 266/68 |
| 4,014,528 | 3/1977 | Sugiyama et al. | 266/66 |

OTHER PUBLICATIONS

"Portable, Automatic All Position Gas Cutting Machine 1K-72T", Kake Sanso Kogyo Co. Ltd., Woodbury, N.J., (Prod. Bull.).
McGraw-Hill Dictionary of Scientific and Technical Term 2nd ed.
AIRCO, Inc.-Instruction Manual for Radiograph Models 10A and 16A Portable Cutting Machines.
Union Carbide-Instruction Manual for CM-79 Portable Carriage.

Primary Examiner—L. Dewayne Rutledge
Assistant Examiner—John P. Sheehan
Attorney, Agent, or Firm—Phillips, Hart & Mozley

[57] ABSTRACT

An apparatus for guiding a tool on a curved path which includes an elongated guide member elastically deformed in the shape of a spline curve and a means responsive to said elastically deformed curved guide member for directing or limiting the movement of the tool to a path responsive to the curved shape of the elastically deformed curved guide member.

13 Claims, 7 Drawing Figures

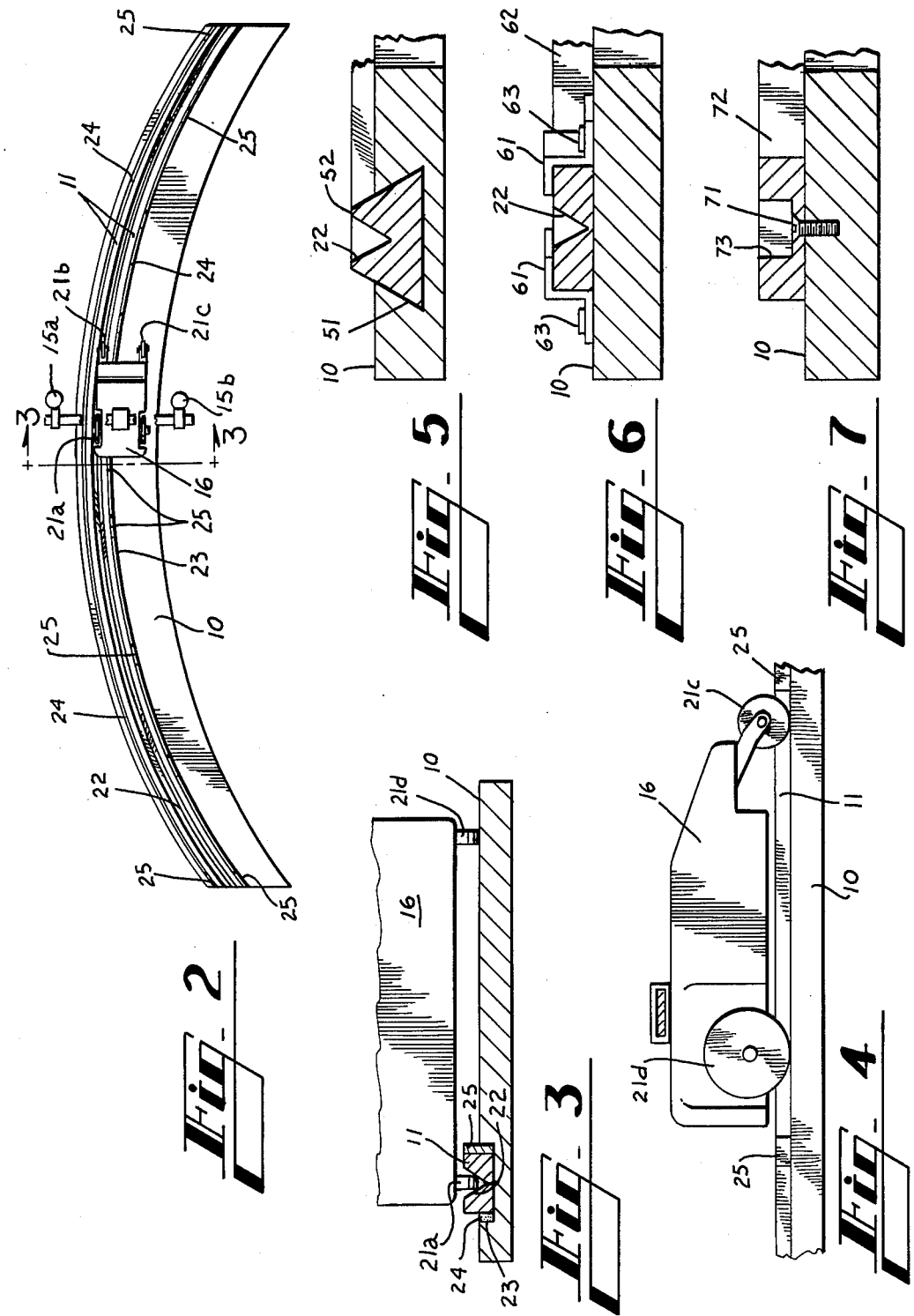

APPARATUS FOR GUIDING A TOOL ALONG A CURVED PATH

BACKGROUND OF THE INVENTION

The present invention relates to the art of guiding tools, such as cutting tools, over a curved path with respect to a work piece.

The cutting of accurate and uniform curved surfaces is a problem which has stimulated attention from artisans over the centuries. With the advent of modern mass production techniques, however, the problem has become even more acute since the artisan may no longer cut the curved surfaces by cutting and fitting the curved surface to adjacent pieces in the final assembly of the finished product. Instead, the techniques of mass production require accuracy, uniformity and interchangeability among the pieces to be used in the various manufacturing and construction processes.

In addition to the needs of mass production, certain specialized manufacturing and construction projects also require accuracy and uniformity among the various curved parts to be used in the process. For example, in the construction of large metal tanks and vessels, the ribs on the inside of the tank or vessel must be accurate in their curvature and must be of uniform curvature and width.

Regardless of whether the materials to be cut are for use in mass production or as a part of a specialized manufacturing or construction process, accuracy, both with regard to the shape of the curve, and the smoothness of the cut, is of paramount importance.

A basic method of cutting a curved surface is to cut a template of the curve which then provides a pattern for cutting other curved pieces. The shape of the curve on the template is often physically plotted on the template before the template is cut, but the accuracy so achieved may be lost if the template is not thereafter cut with precision, if the curve is not accurately transferred from the template to the work piece, or if the cut on the work piece does not precisely follow the curve transferred to the work piece from the template.

Another method of cutting curves is to physically guide the cutting tools along a curved path. One method of guiding the cutting tool is to provide a base having a grooved track along which the tool travels as it makes the cut. While it has been known in the prior art to machine a curved track in a base material to provide such a guide, the large size of many curves makes accurate machining of such curved tracks both expensive and difficult.

Another method of guiding cutting tools is to provide a curved track along which the cutting tool may travel, which curved track is made of "lead or other soft material adapted to be easily bent or curved in the desired direction" such as that shown in U.S. Pat. No. 1,162,587 issued to Peter Eimann. It appears, however, that such curved tracks were permanently bent in the desired curved shape since it appears that the track was capable of maintaining its shape without any external restraints required to preserve the curvature of the track. Further, the accurate formation of such curved tracks undoubtedly required great care and precision. Such tracks also appear to have been cumbersome and somewhat fragile in that great care would be required to avoid distortion of the curvature of the track by rough handling on the job site. Finally, the detailed interface between the curved track and the carriage which it supported may well have required such precision in fabrication that the curved track could not easily, readily and accurately have been fabricated at the job site from readily available materials.

SUMMARY OF THE INVENTION

It has been found that an accurate and durable apparatus for guiding a tool along a curved path may be made from low-cost materials readily available at the job site as set forth more fully in the following specification. The apparatus includes a guide which is made from an elongated strip of material having a uniform cross-section along its length and which is shaped into a curve by "springing" the strip into the curved shape to form a spline curve and then providing a means for restraining the strip in the spline curve shape in order to provide a curved guide member. The durability of the guide may be further achieved by affixing the curve to a base which acts to both restrain the curved guide member and also to provide a means for supporting the cutting tool as it moves along the curved guide member.

Accordingly, it is an objective of the present invention to provide an apparatus for guiding a tool, such as a cutting tool, with precision over an accurate and uniform path relative to a work piece.

It is a further objective of the present invention to provide such an apparatus that can be easily and accurately constructed from low-cost materials.

The foregoing objectives and other objectives and advantages of the present invention will become apparent upon reading the following specification describing one preferred embodiment of the invention and also by reading the claims and referring to the following drawings in which the numbered parts of the embodiment described in the specification are shown by like numbered parts in the drawings.

BRIEF DESCRIPTION OF THE DRAWINGS

FIG. 2 is a top view of the apparatus carrying a cutting tool;

FIG. 3 is a section view taken along line 3—3 in FIG. 2;

FIG. 4 is a side view of the apparatus carrying a cutting tool;

FIG. 5 is a partial cross-section of a first alternative method of affixing the curved guide member to the base;

FIG. 6 is a partial cross-section of a second alternative method of affixing the curved guide member to the base; and FIG. 7 is a partial cross-section of a third alternative method of affixing the curved guide member to the base.

DESCRIPTION OF A PREFERRED EMBODIMENT

Figure 1:
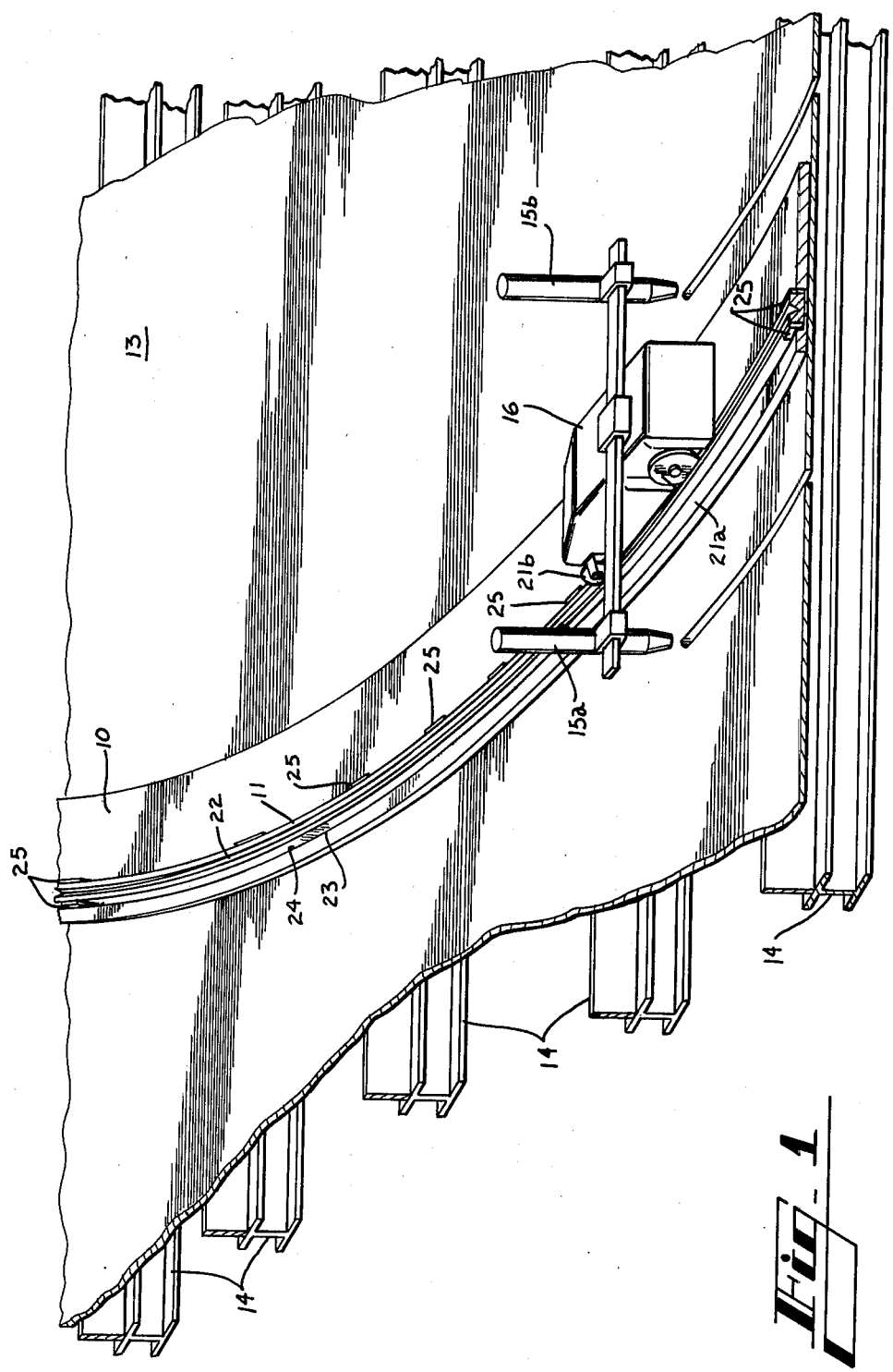
FIG. 1 is a perspective view of the apparatus carrying a cutting tool which is shown in place on a work piece.

It will be understood that the following description of alternative preferred embodiments is set forth solely for the purpose of enabling persons skilled in the art to make and use the present invention according to the inventor's preferred embodiments, and is not intended to limit or restrict the scope of the present invention in any way. The scope of the present invention is limited solely by reference to the appended claims.

As described above, one of the embodiments of the present invention may be used in guiding a cutting tool, such as a cutting torch, along a curved path relative to a work piece, such as a sheet of metal. As shown in FIG. 1, that embodiment includes a base 10, and a curved guide track 11. The base 10 is placed directly on the surface of the work piece 13 which is to be cut. The work piece 13 may be supported in any suitable manner, including a plurality of parallel support beams 14, as shown in FIG. 1. As will be described more fully below, the cutting torches 15a and 15b are mounted on a movable carriage 16, which may either be self-propelled or require external propulsion.

The curved guide track 11 should be made from a relatively hard material, such as fiberglass or aluminum, which will not deform as a result of the pressure and wear resulting from the wheels 21a, and 21b of the carriage 16. The material for the curved guide track 11 must have a narrow cross-section in proportion to its length in order to facilitate elastic deformation of the material along its length and must also be of uniform cross-section along its length so that when subjected to bending forces, it will form a uniform spline curve.

The curved guide track 11 is manufactured by providing an elongated strip of suitable material as described above, which elongated strip includes a longitudinal groove 22 in one of its surfaces. In the preferred embodiment shown in FIGS. 1 through 4, and 6 and 7, the elongated strip is rectangular in cross-section and includes a longitudinal groove 22 cut in its upper surface. The elongated strip having a longitudinal groove 22 may be fabricated either by routing a longitudinal groove 22 in a pre-existing elongated strip, or by extruding an elongated strip of suitable cross-section to provide the longitudinal groove 22.

It has been found that a longitudinal groove 22 having a v-cross section is preferred in order to produce a close fit with the wheels 21a and 21b of the carriage 16. The longitudinal groove 22 should be sufficiently deep and wide to accommodate and guidingly engage the wheels 21a and 21b of the carriage 16 as it moves over the base or support surface 10. In addition, depending upon the method of mounting the curved guide track 11 on the base 10, the depth of the longitudinal groove 22 should be such that, when the curved guide 11 is mounted on the base 10, the wheels 21a and 21b will travel in the groove 22 at the same level as the upper surface of the base 10. Alternatively, the section of the base 10 on which the curved guide track 11 is to be mounted may be recessed or the remainder of the base 10 may be raised in order to assure that the wheels 21a and 21b will travel at the same level as the surface of the base 10. Finally, compensation for any difference between the level at which wheels 21a and 21b are carried in the groove 22 and the support surface of the base 10 on which wheels 21c and 21d travel may be made by machining the wheels 21a and 21d of the carriage 16 in such a manner that the carriage 16 will ride smoothly and level despite the aforesaid difference in levels between the groove 22 in the curved guide track 11 and the upper surface of the base 10.

It has been found that the base 10 may be constructed from wood, plastic, metal or other materials which are rigid and will resist the natural tendency of the curved guide track 11 to straighten. Further, the base 10 must be hard enough to withstand the normal wear and tear to be expected from the operation of the carriage 16 over its support surface without being gouged or otherwise damaged. Therefore, if wood, such as plywood, is used in the construction of the base 10, the plywood should be coated with a substance, such as epoxy, which will increase the surface hardness of the base 10.

The best method of mounting the curved guide track 11 on the base 10 will depend upon the nature of the curve being reproduced. If the curve is complex in nature, having numerous inflection points and curvatures, characterized by radii less than eight times the wheel base of the carriage 16 being used in conjunction with the particular embodiment, it becomes difficult to accurately route a recessed curve 23 in the base 10 as shown in FIGS. 1 through 4, or a dove-tailed recessed curve 51 as shown in FIG. 5. With regard to such complex curves, however, it is generally desirable to fasten the curved guide track 11 to the base 10 by means of a plurality of mechanical fasteners 61 as shown in FIG. 6, a plurality of screws 71 as shown in FIG. 7, or by a chemical bonding agent such as an epoxy, or by any combination of the aforesaid methods of fastening the curved guide track 11 to the base 10. While any epoxy having a high degree of viscosity, a high degree of tackiness and a quick gel time will be suitable for use as a chemical bonding agent, it has been found that ARCON E154A and B, manufactured by Allied Resin Corp., Waymount Industrial Park, Waymount, Mass. is a suitable chemical bonding agent.

With regard to the method of mounting the curved guide track 11 on the base 10 as shown in FIGS. 1 through 5, the curved track 11 is mounted by first routing a curved recess 23 in the base surface 10. This initial curved recess 23 will serve as a bed for the curved guide track 11 which will be subsequently placed in the recess 23. Therefore, it is necessary that the initial curved recess 23 approximate the desired curvature of the curved guide track 11 which will ultimately determine the shape and curvature of the predetermined path over which the cutting torches 15a and 15b will be guided. The approximate shape of the curved recess 23 may be laid out according to conventional techniques so as to provide a suitable bed for the curved guide track 11.

The width of the initial curved recess 23 should be sufficient to permit the subsequent embedding of the curved guide track 11 in the curved recess 23. The width should also be sufficient to provide a certain degree of play or freedom of lateral movement for the curved guide track 11 so that the curve can be finely adjusted in the curved recess 23.

Once the curved guide track 11 has been placed in the curved recess 23 in the bed 10, it will approximate the desired curvature for the curve. It is necessary, however, to provide further uniformity and accuracy in the curve as shown in FIGS. 1 through 3, by placing shims 25 between the curved guide track 11 and the forward edge of the curved recess 23 at the ends of the curved guide track 11, and to place shims 25 between the edge of the curved guide track 11 and the rearward edge of the curved recess 23 interior of the ends of the curved guide track 11. The precise shape of the curve may thereafter be adjusted by the subsequent placement of shims 25 between the edges of the curved recess 23 and the curved guide track 11.

Once the desired curvature of the curved guide track 11 within the curved recess 23 is achieved, the curved guide track 11 may be fixed within the recess 23 by any suitable means. It has been found that the introduction of an epoxy material 24 between the edges of the curved groove 23 and the curved guide track 11 provides a suitable bond. Mechanical fasteners of suitable design may also be used.

Alternatively, as shown in FIG. 5, the curved recess 51 may be of a dove-tailed cross-section which will aid in securing a curved guide track 52 of similar dove-tailed cross-section in the curved recess 51. Of course, with the dove-tailed curved recess 51, the tolerances between the curved guide track 52 and the curved recess 51 should be close in order to provide a good dovetail fit. The curved guide track 52 may be further secured in the curved recess 51 of the base 10 by means of an epoxy material 24 or by use of mechanical fasteners of suitable design.

As shown in FIG. 6, a second alternative method of mounting the curved guide track on the base 10 is the mounting of a curved guide track 62 by means of plurality of mechanical fasteners 61. The mechanical fasteners 61 should be mounted on both sides of the curved guide track 62 in order to constrain the curved guide track 62 in the desired curved form. The mechanical fasteners 61 may be affixed to the base 10 by means of a plurality of screws 63, or by bolts, pins or nails, depending upon the material utilized in making the base 10 and mechanical fasteners 61.

A third alternative method of mounting the curved guide track on the base 10 is shown on FIG. 7. The third alternative method includes fastening the curved guide track 72 to the base 10 by means of a plurality of screws 71. In mounting the curved guide track in the manner shown in FIG. 7, it is necessary to provide a longitudinal groove 73 having a rectangular cross-section. Depending upon the material used for the curved guide track 72 and the base 10, it may be necessary to drill a plurality of holes along the longitudinal groove 73 of the curved guide track 72 in order to accommodate the plurality of screws 71.

A fourth alternative method of mounting the curved guide track is described above in connection with the methods of mounting a curved guide track shown in FIGS. 1 through 5. An epoxy material 25 having qualities as previously described may be used either in combination with one of the aforesaid methods of mounting the curved guide track or many be used exclusively to mount the guide track without the aid of recesses or mechanical fasteners.

As further described above, the exclusive use of either mechanical fasteners as shown in FIGS. 6 and 7 or the exclusive use of an epoxy material or other suitable chemical bonding material is particularly desirable in providing curved guide tracks for complex curves. With regard to such complex curves, it becomes difficult and impractical to provide accurate recesses 23 or 51, and greater accuracy may therefore be achieved by mounting the curved guide track by mechanical fasteners or by means of an epoxy material or other suitable chemical bonding agent.

Of course, it will be understood that the curved guide track may be mounted by any combination of the foregoing illustrative methods or by other methods without departing from the basic spirit and scope of the present invention.

The design of the carriage 16 is not critical to the successful operation of the preferred embodiments described above. However, it has been found that a number of commercially available small tractors are suitable for use as the carriage 16 with the preferred embodiments described above. One such tractor is the Lindy OM-48 tractor manufactured by Union Carbide Corporation. This tractor has variable speed drives and is designed to operate on a grooved track, with the tractor wheels riding in the groove and following the track. The cutting torches 15a and 15b may be oxygen-acetylene, oxygen-fuel or plasma arc torches which fit into attachments carried by the carriage 16 and are supported in a laterally displaced arrangement on either side of the carriage 16 at varying distances. Of course, it will be understood that any suitable tractor may be used as the carriage 16 in conjunction with the preferred embodiments described above.

It has been found, however, that tractors most suitable for use with the preferred embodiment described above may require modification when used as the carriage 16. For example, the tractor used as the carriage 16 should be modified so that there is only one drive wheel 21a which engages the curved guide track 11. The wheel 21d opposite drive wheel 21a should be disconnected from the drive assembly so that it rolls freely. It may also be necessary to machine the rolling surface of wheel 21d smooth so that it in no way interfers with the guidance of the carriage 16 along the curved guide track 11 and over the base 10. In addition, it may also be desirable to remove wheel 21c to minimize the interference with the guidance of the carriage 16 along the curved guide track 11 and over the base 10. However, wheel 21c should only be removed if the weight of the carriage 16 is properly distributed to permit the carriage 16 to roll freely over the base 10 on the three remaining wheels 21a, 21b and 21d, without loss of balance.

As shown in FIG. 1, the apparatus is used by placing it on a suitably supported work piece 13. One advantage to the use of wood as the material for the base 10 is that the wood takes on the surface of the work piece thereby providing further accuracy in the cutting of the curve. The curved cut in the work piece 13 may be made on either or both sides of the apparatus depending on the placement of the cutting torches 15a and 15b supported by the carriage 16. The curved cuts are made by moving the carriage 16 along the curved guide track 11 over the desired distance or radius for a desired cut.

From the foregoing description of a preferred embodiment of the present invention, it may be seen that the present invention provides an apparatus for guiding a cutting tool along a curved path relative to a work piece. It will, however, be understood by those skilled in the art that the present invention may be adapted to provide a means for guiding a variety of tools over a curved path relative to a work piece. It will be further understood that the manufacture and use of the uniform spline curve track may be adapted to use with a variety of other mechanisms or systems for providing ultimate guidance of a tool in response to the uniform spline curve track without departing from the scope and spirit of the present invention. It will therefore be understood that the embodiments of the present invention described above are merely illustrative, and that the present invention is limited solely by the appended claims.

We claim:

1. An apparatus for guiding a tool along a predetermined curved path in relation to a work piece, including:
   (a) A spline member elastically deformed in the shape of a curve to provide a curved guide member;
   (b) A first means for holding said spline member in the shape of a curve, and (c) A second means responsive to said curved guide member for directing the movement of said tool in a predetermined curved path in relation to said work piece.

2. An apparatus as set forth in claim 1 wherein said spline member is an elongated strip member.

3. An apparatus as set forth in claim 2 wherein said elongated strip member includes a longitudinal track.

4. An apparatus as set forth in claim 3 wherein said longitudinal track includes at least one longitudinal groove formed in an outer surface of said elongated strip.

5. An apparatus as set forth in claim 4 wherein said second means includes a carriage having wheels in communication with said longitudinal track, and wherein said tool is mounted on said carriage.

6. An apparatus as set forth in claim 5 wherein said first means includes a base having a curved groove, and wherein said elongated strip is embedded in said curved groove.

7. An apparatus for guiding a tool along a predetermined curved path in relation to a work piece, including:
   (a) An elongated strip capable of being elastically deformed in the shape of a curve and having a longitudinal track including a longitudinal groove in at least one surface of said elongated strip,
   (b) A base having a planar surface and including a curved groove in the planar surface of the said base, which curved groove restrainingly carries said elongated strip; and
   (c) A carriage carrying said tool and having at least one wheel in communication with said longitudinal track.

8. A method of manufacturing an apparatus for guiding a tool along a predetermined curved path in relation to a work piece, said apparatus including an elongated strip member elastically deformed in the shape of a curve to provide a curved guide member, and a means for securing said elongated strip in the shape of a curve, which method includes the following steps:
   (a) Elastically deforming said elongated strip member into the shape of a curve to provide a curved guide member;
   (b) Securing said elongated strip member in the shape of a curve; and
   (c) Providing a means responsive to said elongated strip member for guiding a tool in a predetermined path relative to said work piece.

9. A method of manufacturing an apparatus for guiding a tool along a predetermined curve path in relation to a work piece, including an elongated strip member elastically deformed in the shape of a curve to provide a curved guide member, a securing means for securing said guide member in the shape of a curve, which securing means includes a base for carrying said tool having a curved groove in planar surface of said base, which method includes the following steps:
   (a) Elastically deforming said elongated strip member into the shape of a curve to provide a curved guide member;
   (b) Securing said elongated strip member in the shape of a curve by fitting said elongated strip member into said curved groove in said base; and
   (c) Providing a means responsive to said elongated strip member for guiding said tool in a predetermined path relative to said work piece.

10. A process as set forth in claim 9, wherein said step of securing said elongated strip member in the shape of a curve includes embedding said elongated strip member into said groove by applying an epoxy material in said groove about said elongated strip member and permitting said epoxy material to harden about said elongated strip member.

11. An apparatus for guiding a tool along a curved path in relation to the work piece, said apparatus including an elongated strip member, elastically deformed in the shape of a curve to provide a curved guide member and a means for securing said guide member in the shape of a curve, which apparatus is manufactured according to the following method:
   (a) Elastically deforming said elongated strip member into the shape of a curve to provide a curved guide member;
   (b) Securing said elongated strip member in said shape of a curve; and
   (c) Providing a means responsive to said elongated strip member for guiding said tool in a predetermined path relative to said work piece.

12. An apparatus for guiding a tool along a predetermined curved path in relation to work piece, including an elongated strip member elastically deformed in the shape of a curve to provide a curved guide member, a securing means for securing said guide member in the shape of a spline curve which securing means includes a base upon which said tool is carried having a curved groove in a planar surface of said base, which apparatus is manufactured according to the following method:
   (a) Elastically deforming said elongated strip member into the shape of a curve to provide a curved guide member;
   (b) Securing a flexible elongated strip member into the shape of a curve by fitting said elongated strip member into said curved groove in said base; and
   (c) Providing a means responsive to said elongated strip member of guiding said tool in a predetermined path relative to said work piece.

13. An apparatus as set forth in claim 12 wherein said step of securing said elongated strip member includes embedding said elongated strip member in said curved groove by applying an epoxy material in said curved groove about said elongated strip member and permitting said epoxy material to harden.

* * * * *